United States Patent
Kawakami (10) Patent No.: US 8,872,208 B2
(45) Date of Patent: Oct. 28, 2014

(54) LIGHT SOURCE DEVICE AND LIGHTING DEVICE

(75) Inventor: Yasuyuki Kawakami, Tokyo (JP)

(73) Assignee: Stanley Electric Co., Ltd., Tokyo (JP)

(*) Notice: Subject to any disclaimer, the term of this patent is extended or adjusted under 35 U.S.C. 154(b) by 0 days.

(21) Appl. No.: 13/476,745

(22) Filed: May 21, 2012

(65) Prior Publication Data

US 2013/0056775 A1 Mar. 7, 2013

(30) Foreign Application Priority Data

May 20, 2011 (JP) ................................. 2011-113546

(51) Int. Cl.
| | | |
|---|---|---|
| *H01L 33/50* | (2010.01) | |
| *F21S 8/10* | (2006.01) | |
| *F21V 9/16* | (2006.01) | |
| *G02F 1/00* | (2006.01) | |
| *F21Y 101/02* | (2006.01) | |

(52) U.S. Cl.
CPC ............... *F21V 9/16* (2013.01); *F21S 48/1317* (2013.01); *F21Y 2101/02* (2013.01); *F21S 48/1145* (2013.01); *G02F 1/00* (2013.01)
USPC .................................... 257/98; 257/E33.061

(58) Field of Classification Search
USPC ............................................ 257/98, E33.061
See application file for complete search history.

(56) References Cited

U.S. PATENT DOCUMENTS

| | | | | |
|---|---|---|---|---|
| 1,605,199 | A * | 11/1926 | Bacon ............................. | 160/47 |
| 7,537,374 | B2 * | 5/2009 | Schardt et al. ................ | 362/623 |
| 2002/0121606 | A1 * | 9/2002 | Okada et al. ............. | 250/370.11 |
| 2004/0159849 | A1 * | 8/2004 | Negley ............................. | 257/98 |
| 2005/0269582 | A1 | 12/2005 | Mueller et al. | |
| 2007/0040959 | A1 * | 2/2007 | Liao ............................. | 349/62 |
| 2008/0067536 | A1 * | 3/2008 | Komoto et al. ............... | 257/98 |
| 2010/0314650 | A1 * | 12/2010 | Sugimori ........................ | 257/98 |
| 2011/0149549 | A1 | 6/2011 | Miyake | |

FOREIGN PATENT DOCUMENTS

| | | |
|---|---|---|
| JP | 2004-55360 A | 2/2004 |
| JP | 2004-341105 A | 12/2004 |
| JP | 2006-5367 A | 1/2006 |
| JP | 2011-129354 A | 6/2011 |

* cited by examiner

*Primary Examiner* — Marc Armand
(74) *Attorney, Agent, or Firm* — Kenealy Vaidya LLP

(57) ABSTRACT

A light source can include: a light source that emits light of a predetermined wavelength within a wavelength region covering the wavelength of ultraviolet light and that of visible light; and a wavelength conversion layer containing a fluorescent material of at least one type that is excited by excitation light from the fixed light source to emit fluorescent light of a wavelength longer than that of light emitted from the fixed light source. The fixed light source and the wavelength conversion layer can be spaced from each other. The light source device can employ a reflection system of extracting at least fluorescent light from an incident surface of the wavelength conversion layer through which excitation light from the fixed light source enters the wavelength conversion layer. The wavelength conversion layer can have a surface structure with depressions or projections.

21 Claims, 7 Drawing Sheets

LIGHT SOURCE DEVICE AND LIGHTING DEVICE

This application claims the priority benefit under 35 U.S.C. §119 of Japanese Patent Application No. 2011-113546 filed on May 20, 2011, which is hereby incorporated in its entirety by reference.

TECHNICAL FIELD

The presently disclosed subject matter relates to a light source device and a lighting device.

BACKGROUND ART

A light source device using an optical semiconductor element such as an LED and a wavelength conversion layer such as a fluorescent layer in combination has been in widespread use. As a result of recent trends toward higher brightness, such a light source device has been applied in a wider range of applications including general lighting and in automobile and other vehicle headlights. This type of light source device is considered to be able to provide a wider range of applications if it continues to increase in terms of its brightness.

The brightness of the aforementioned light source device using an optical semiconductor element and a wavelength conversion layer in combination may be increased by applying a large current to the optical semiconductor element to increase the intensity of excitation light emitted from the optical semiconductor element. However, the actual situation is such that heat is generated in the wavelength conversion layer to cause discoloration of a resin component or temperature quenching of a wavelength conversion material in the wavelength conversion layer, leading to reduction of the intensity of fluorescent light. This may lead to saturation or reduction of the intensity of emitted light, making it difficult to increase the brightness of a light source device utilizing an optical semiconductor element and a wavelength conversion layer in combination.

In order to form a wavelength conversion layer into a fixed shape with a high degree of reproducibility, the wavelength conversion layer is generally formed by blending wavelength conversion material powder and a resin component to prepare paste thereof, and applying the paste by a printing method and the like. The aforementioned discoloration of the resin component in the wavelength conversion layer is a phenomenon where the resin component is discolored if the resin component is heated to a temperature of about 200° C. or higher. A resin component is originally transparent. Accordingly, if discolored with heat, the resin component absorbs part of the excitation light from an optical semiconductor element or fluorescent light from a wavelength conversion layer, placing an obstacle to increasing the brightness.

The aforementioned temperature quenching of a wavelength conversion material is a phenomenon where the intensity of fluorescent light is reduced if the wavelength conversion material is heated. As a result of reduction of the intensity of fluorescent light due to temperature quenching, energy not having been converted to fluorescent light becomes heat to increase the amount of heat generation of the wavelength conversion material. This increases the temperature of the wavelength conversion material further to promote the temperature quenching, leading to further reduction of the intensity of fluorescent light. Accordingly, the temperature quenching of a wavelength conversion material due to heat generation also places an obstacle to increasing the brightness in the device or lamp.

The aforementioned characteristics and problems may be solved or at least addressed by a light source suggested by Japanese Patent Application Laid-Open No. 2006-005367. This light source uses a wavelength conversion layer not containing resin. In this case, the wavelength conversion layer does not contain a resin component, so that discoloration of a resin component does not occur. Further, the wavelength conversion layer can be a ceramic layer made of a wavelength conversion material of low sensitivity to temperature. This avoids generation of temperature quenching, making it possible to increase brightness. The light source of Japanese Patent Application Laid-Open No. 2006-005367 is intended to let heat generated in a fluorescent layer 92 dissipate to an optical semiconductor element (fixed light source) 95 by connecting the fluorescent layer 92 directly to the optical semiconductor element (fixed light source) 95 as shown in FIG. 1.

Figure 1:
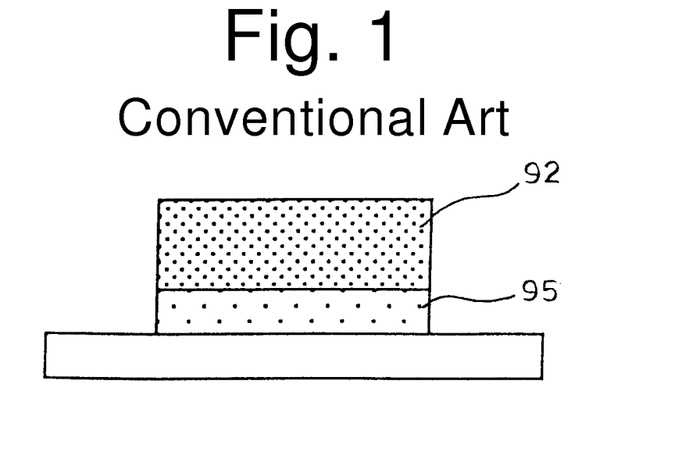
FIG. 1 is a schematic cross-sectional view showing a conventional light source device.

The conventional light source device shown in FIG. 1 where the optical semiconductor element (fixed light source) 95 and the fluorescent layer 92 are directly connected makes use of fluorescent light and excitation light. The fluorescent light to be used can be part of the light (fluorescent light) emitted from the fluorescent layer 92 excited with excitation light from the optical semiconductor element (fixed light source) 95, and which is to exit in a direction opposite to the optical semiconductor element (fixed light source) 95. The excitation light to be used is light emitted from the optical semiconductor element (fixed light source) 95, and which is transmitted through the fluorescent layer 92 without being absorbed in the fluorescent layer 92. To be specific, the light source device of FIG. 1 adopts a transmission system making use of light transmitted through the fluorescent layer 92.

Light emitted from the fluorescent layer 92 can include the aforementioned transmitted light and additionally, reflecting light that is specifically light going back to the optical semiconductor element (fixed light source) 95 after being reflected off an interface between the optical semiconductor element 95 and the fluorescent layer 92. This light (reflecting light) can be absorbed in the optical semiconductor element (fixed light source) 95 again, so that it cannot be used as illuminating light.

The light source device of FIG. 1 is intended to let heat of the fluorescent layer 92 be dissipated to the optical semiconductor element (fixed light source) 95. Meanwhile, if the intensity of excitation light from the optical semiconductor element (fixed light source) 95 is increased, heat can be generated not only in the fluorescent layer 92 but also in the optical semiconductor element (fixed light source) 95. This means that heat generated in the fluorescent layer 92 is caused to be dissipated to the optical semiconductor element (fixed light source) 95 that also generates heat, leading to poor efficiency of heat dissipation.

Accordingly, adoption of the transmission system and the poor efficiency of dissipation of heat generated in the fluorescent layer 92 of the light source device of FIG. 1 place limitations on the increase of brightness.

SUMMARY

The presently disclosed subject matter was devised in view of these and other characteristics, problems and features and in association with the conventional art. According to an aspect of the presently disclosed subject matter, a light source device and a lighting device capable of achieving brightness sufficiently higher than conventionally achieved brightness can be provided.

According to another aspect of the presently disclosed subject matter, a light source device can include: a fixed light source configured to emit light of a predetermined wavelength within a wavelength region covering the wavelength of ultraviolet light and that of visible light; and a wavelength conversion layer containing a wavelength conversion material of at least one type that is excited by excitation light from the fixed light source to emit fluorescent light of a wavelength longer than that of light emitted from the fixed light source. In this light source device, the fixed light source and the wavelength conversion layer can spatially be spaced from each other. The light source device can employ a reflection system of extracting at least fluorescent light from a surface of the wavelength conversion layer through which excitation light from the fixed light source can enter the wavelength conversion layer. In this configuration, the wavelength conversion layer can have a surface structure with depressions or projections.

According to still another aspect of the presently disclosed subject matter, in the light source device described above, the wavelength conversion layer can include a wavelength conversion material plate, and a plurality of segments in the form of depressions or projections formed on the wavelength conversion material plate, and the size of each of the segments can be smaller than the size of an irradiation spot of excitation light from the fixed light source.

According to still another aspect of the presently disclosed subject matter, in the light source device described above, the wavelength conversion layer can be made of fluorescent ceramic.

According to still another aspect of the presently disclosed subject matter, the light source device described above can be configured to include a fluorescent rotary body having the wavelength conversion layer.

According to still further another aspect of the presently disclosed subject matter, a lighting device can utilize the light source device as described above.

The wavelength conversion layer can be a fluorescent material layer, a so-called fluorescent layer.

According to any of the above configurations, the light source device can be configured to include: the fixed light source that emits light of a predetermined wavelength within a wavelength region covering the wavelength of ultraviolet light and that of visible light; and the wavelength conversion layer or a fluorescent layer containing a wavelength conversion material of at least one type that is excited by excitation light from the fixed light source to emit fluorescent light of a wavelength longer than that of light emitted from the fixed light source. The fixed light source and the wavelength conversion layer can spatially be spaced from each other. The light source device can employ a reflection system of extracting at least fluorescent light from the surface of the wavelength conversion layer through which excitation light from the fixed light source can enter the wavelength conversion layer. Thus, the light source device can achieve brightness sufficiently higher than conventionally achieved brightness.

In particular, the wavelength conversion layer can have a surface structure with depressions or projections. Thus, the light source device can prevent increase of an excitation density in the wavelength conversion layer and also prevent local increase of the temperature of the wavelength conversion layer while generating no reduction of brightness, thereby preventing the temperature quenching of the wavelength conversion layer. Further, if the wavelength conversion layer is made of a fluorescent ceramic and the like, cracking of the wavelength conversion layer (made of the fluorescent ceramic and the like) is prevented.

If the light source device can include the fluorescent rotary body having the wavelength conversion layer, the wavelength conversion layer can be caused to rotate relative to the fixed light source, whereby excitation light from the fixed light source is applied in a dispersed manner to the wavelength conversion layer. This can suppress generation of heat in an area irradiated with the light, making it possible to increase brightness to a higher level.

BRIEF DESCRIPTION OF DRAWINGS

These and other characteristics, features, and advantages of the presently disclosed subject matter will become clear from the following description with reference to the accompanying drawings, wherein.

DESCRIPTION OF EXEMPLARY EMBODIMENTS

A description will now be made below to light source devices and lighting devices of the presently disclosed subject matter with reference to the accompanying drawings in accordance with exemplary embodiments.

Figure 2:
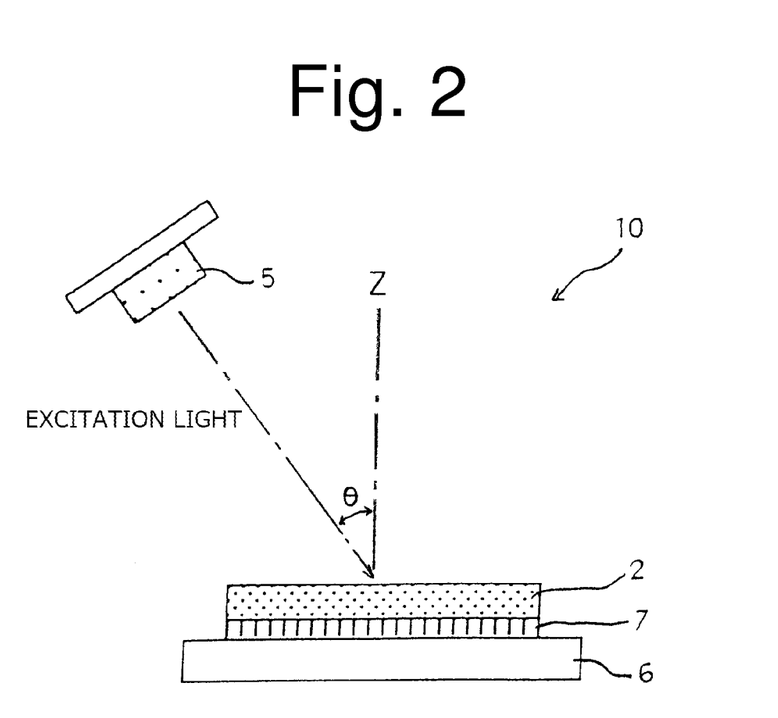
FIG. 2 shows a light source device described in an application (Japanese Patent Application No. 2009-286397) filed by the same applicant of the instant application.

FIG. 2 shows a light source device described in an application (Japanese Patent Application No. 2009-286397) filed by the applicant of the instant application. Referring to FIG. 2, a light source device 10 can include a fixed light source 5 that emits light of a predetermined wavelength within a wavelength region covering the wavelength of ultraviolet light and that of visible light, and a fluorescent layer 2 (wavelength conversion layer) containing a fluorescent material (wavelength conversion material) of at least one type that is excited by excitation light from the fixed light source 5 to emit fluorescent light of a wavelength longer than that of light emitted from the fixed light source 5. The fixed light source 5 and the fluorescent layer 2 can spatially be spaced from each other.

The fluorescent layer 2 may contain a resin component (for example, the fluorescent layer 2 may be formed by dispersing a fluorescent material in a highly transparent resin such as silicone resin and applying it). The fluorescent layer 2 may alternatively be glass sealed. Furthermore, the fluorescent layer 2 may contain substantially no resin component (such as fluorescent ceramic).

A substrate (heat dissipation substrate) 6 having light reflectivity and heat conductivity can be provided to face a surface of the fluorescent layer 2 opposite to an incident surface of the fluorescent layer 2 to receive the aforementioned excitation light. The fluorescent layer 2 can be connected to the heat dissipation substrate 6 through a connecting part 7. The connecting part 7 can also be made of a material having light reflectivity and heat conductivity.

The light source device 10 adopts a system (hereinafter called reflection system) of extracting light (including excitation light and fluorescent light) by using reflection occurring at a reflection surface being provided at the surface of the fluorescent layer 2 opposite to the incident surface thereof to receive excitation light from the fixed light source 5.

As described above, the light source device 10 can basically be configured such that the fixed light source 5 and the fluorescent layer 2 are spaced from each other, and such that the light source device 10 makes use of light emitted in the reflection system.

To be specific, if the fluorescent layer 92 is in contact with the fixed light source 95 as in the conventional light source device shown in FIG. 1, both the fluorescent layer 92 and the fixed light source 95 are heated in response to an effort to increase brightness. This leads to poor efficiency of dissipation of heat from the fluorescent layer 92. In contrast, the fluorescent layer 2 can be spaced from the fixed light source 5 in the light source device of FIG. 2. Accordingly, even if an effort is made to increase brightness, heat is still allowed to dissipate from the fluorescent layer 2 through the connecting part 7 to the heat dissipation substrate 6 at a low temperature. As a result, heat is allowed to dissipate from the fluorescent layer 2 at an efficiency considerably higher than that of the conventional light source device shown in FIG. 1.

The conventional light source device shown in FIG. 1 makes use of fluorescent light and excitation light. The fluorescent light to be used is part of the light that is emitted from the fluorescent layer 92 (after excitation), and which is to exit in a direction opposite to the fixed light source 95. The excitation light to be used is part of light emitted from the fixed light source 95, and which is transmitted through the fluorescent layer 92 without being absorbed in the fluorescent layer 92. To be specific, the light source device of FIG. 1 adopts a transmission system. In the transmission system, regarding light emitted from the fluorescent layer 92, excitation light includes the aforementioned transmitted light and additionally, reflecting light that is specifically light going back to the fixed light source 95 after reflecting off an interface between the fixed light source 95 and the fluorescent layer 92. This reflecting light is absorbed in the fixed light source 95 again, so that it cannot be used as illuminating light. Also, fluorescent light from the fluorescent layer 92 exits through the opposite surfaces of the fluorescent layer 92, so that the fluorescent light exiting in a direction toward the fixed light source 95 cannot be used as illuminating light either. Thus, the transmission system reduces efficiency of use of light. Further, the transmission system requires the fluorescent layer 92 to have a great thickness in order to obtain illuminating light of intended chromaticity. Accordingly, a distance between the fluorescent layer 92 and the fixed light source 95 is increased, and this acts disadvantageously on dissipation of heat from the fluorescent layer 92 to the fixed light source 95.

In contrast, the light source device 10 of FIG. 2 adopts the reflection system. In this reflection system, light (including excitation light and fluorescent light) exiting in a direction opposite to the fixed light source 5 can be caused to reflect off a reflection surface (a reflection surface of the substrate 6, for example) to travel in a direction toward the fixed light source 5. Accordingly, all the light (fluorescent light) from the fluorescent layer 2 excited by excitation light from the fixed light source 5 (specifically, fluorescent light to exit in a direction toward the fixed light source 5), and all the excitation light from the fixed light source 5 not having been absorbed in the fluorescent layer 2 (specifically, light obtained as a result of reflection of light from the fixed light source 5 and not having been absorbed in the fluorescent layer 2) can be used as illuminating light (to be specific, both the excitation light and the fluorescent light can be used efficiently as illuminating light). This significantly increases the efficiency of use of light to allow increase of brightness. Further, even if the thickness of the fluorescent layer 2 can be half of the thickness or smaller than half of the thickness of a corresponding fluorescent layer of the conventional transmission type, the reflection type can maintain the same optical path length in the fluorescent layer 2 as that in the transmission type to obtain light of the same chromaticity. Thus, the reflection type can allow reduction of the thickness of the fluorescent layer 2 to shorten a distance from the fluorescent layer 2 to the substrate 6, thereby acting advantageously on heat dissipation.

As described above, the light source device 10 of FIG. 2 can be configured such that the fixed light source 5 and the fluorescent layer 2 can be spaced from each other, and such that the light source device 10 can make use of light emitted in the reflection system. Accordingly, the light source device 10 can achieve brightness sufficiently higher than conventionally achieved brightness.

Additionally, in the light source device 10 of FIG. 2, if the fluorescent layer 2 contains substantially no resin component, discoloration with heat does not occur and light is absorbed less. In this case, brightness can be increased to a higher level.

Herein, the fluorescent layer 2 containing substantially no resin component means that a resin component typically used for formation of a fluorescent layer can constitute 5% by weight or smaller than 5% by weight of the fluorescent layer. Examples of such a fluorescent layer may include one realized by dispersing fluorescent powder in glass, a glass fluorescent material formed by adding luminescent center ions to a glass matrix, and a single crystal or a polycrystal of a fluorescent material (hereinafter called fluorescent ceramic). During manufacturing process of a fluorescent material, a material is formed into an arbitrary shape, and then sintered. The fluorescent ceramic can be a mass of the resultant fluorescent material. The fluorescent ceramic may use an organic component as a binder during shaping as one of the processes of manufacturing the fluorescent ceramic. This organic component can be fired (decomposed and vaporized) in a degreasing step performed after the shaping. Accordingly, the organic resin component can constitute only 5% by weight or smaller than 5% by weight of the sintered fluorescent ceramic. This means that the fluorescent layer described here contains substantially no resin component and is composed only of an inorganic material, so that discoloration with heat does not occur or is substantially prevented. Generally, glass or ceramic composed only of an inorganic material has heat conductivity higher than that of resin. This acts advantageously on dissipation of heat from the fluorescent layer 2 to the substrate 6. In particular, fluorescent ceramic generally has heat conductivity still higher than that of glass and is manufactured at lower costs than those required to manufacture a single crystal. In this regard, fluorescent ceramic can be advantageously used to form the fluorescent layer 2.

The fluorescent layer 2 can contain a fluorescent material of at least one type that is excited by excitation light from the fixed light source 5 to emit fluorescent light of a wavelength longer than that of the light emitted from the fixed light source 5. More specifically, if the fixed light source 5 emits ultraviolet light, the fluorescent layer 2 can contain at least one of blue, green, and red fluorescent materials, for example. If the fixed light source 5 emits ultraviolet light, and if the fluorescent layer 2 contains blue, green, and red fluorescent materials, for example (if the fluorescent layer 2 contains a mixture of uniformly dispersed blue, green, and red fluorescent materials, for example), irradiation of the fluorescent layer 2 with ultraviolet light from the fixed light source 5 results in white illuminating light obtained as reflecting light. If the fixed light source 5 emits ultraviolet light, and if the fluorescent layer 2 contains a blue, green, or red fluorescent material, for example, irradiation of the fluorescent layer 2 with ultraviolet light from the fixed light source 5 results in blue, green, or red illuminating light (single-color light) obtained as reflecting light. If the fixed light source 5 emits blue light being visible light, the fluorescent layer 2 can contain at least one of green, red, and yellow fluorescent materials, for example. If the fixed light source 5 emits blue light being visible light, and if the fluorescent layer 2 contains green and red fluorescent materials, for example (if the fluorescent layer 2 contains a mixture of uniformly dispersed green and red fluorescent materials, for example), irradiation of the fluorescent layer 2 with blue light from the fixed light source 5 results in white illuminating light and the like obtained as reflecting light. If the fixed light source 5 emits blue light being visible light, and if the fluorescent layer 2 contains only a yellow fluorescent material, for example, irradiation of the fluorescent layer 2 with blue light from the fixed light source 5 results in white illuminating light and the like obtained as reflecting light. As described above, single-color light or white light can be obtained by devising a combination of the fixed light source 5 and the fluorescent layer 2 appropriately.

In the light source device 10 of FIG. 2, the heat dissipation substrate 6 can function as a reflection surface that causes reflection of light (including light (fluorescent light) emitted from the fluorescent layer 2 excited by excitation light from the fixed light source 5 and light from the fixed light source 5 not having been absorbed in the fluorescent layer 2). The heat dissipation substrate 6 can further function to let heat conducted from the fluorescent layer 2 dissipate to the outside, and to support the fluorescent layer 2. Accordingly, the heat dissipation substrate 6 can be configured to have excellent light reflecting properties, heat conduction properties, and processability. A metal substrate, a substrate made of oxide ceramics such as alumina, or a substrate made of nonoxide ceramics such as aluminum nitride can be used as the heat dissipation substrate 6. Meanwhile, it is desirable that a metal substrate having excellent light reflecting properties, excellent heat conduction properties, and excellent processability can be used as the heat dissipation substrate 6.

The connecting part 7 connecting the fluorescent layer 2 and the heat dissipation substrate 6 can also function as a reflection surface that causes reflection of light (including light (fluorescent light) emitted from the fluorescent layer 2 excited by excitation light from the fixed light source 5 and light from the fixed light source 5 not having been absorbed in the fluorescent layer 2). The connecting part 7 can further function to let heat conducted from the fluorescent layer 2 dissipate to the outside. Accordingly, it is desirable, for example, that metal (brazed metal) having excellent light reflecting properties and heat conduction properties be used as the connecting part 7. An organic adhesive, an inorganic adhesive, a low melting point glass, or metal (brazed metal) may be used to form the connecting part 7.

In the light source device 10 of FIG. 2, excitation light from the fixed light source 5 is caused to enter the fluorescent layer 2 obliquely, namely, at a predetermined angle θ (where θ is not zero degrees) relative to an axis Z that is perpendicular to a surface of the fluorescent layer 2 on which the excitation light is projected. This allows the excitation light to be projected on an increased area of the fluorescent layer 2, compared to the case where the excitation light enters the fluorescent layer 2 in the direction of the axis Z that is perpendicular to the surface of the fluorescent layer 2 on which the excitation light is projected (namely, where θ is zero degrees). As a result, an excitation density is not increased in the fluorescent layer 2 and the temperature is not increased locally in the fluorescent layer 2, thereby preventing the temperature quenching of the fluorescent layer 2. Further, if the fluorescent layer 2 is made of fluorescent ceramic and the like, cracking of the fluorescent layer 2 (made of fluorescent ceramic and the like) can be prevented.

In the light source device 10 of FIG. 2, excitation light from the fixed light source 5 is caused to enter the fluorescent layer 2 obliquely to allow the excitation light to be projected on an increased area of the fluorescent layer 2, thereby preventing increase of an excitation density in the fluorescent layer 2. At the same time, this results in reduction of brightness, compared to the case where excitation light enters the fluorescent layer 2 in the direction of the axis Z perpendicular to the surface of the fluorescent layer 2 on which the excitation light is projected (namely, where θ is zero degrees). The presently disclosed subject matter has been made to address and prevent the aforementioned problem. Accordingly, a light source device and a lighting device is disclosed that is capable of preventing increase of an excitation density in a fluorescent layer and preventing local increase of the temperature of the fluorescent layer while generating little or no reduction of brightness.

Figure 3:
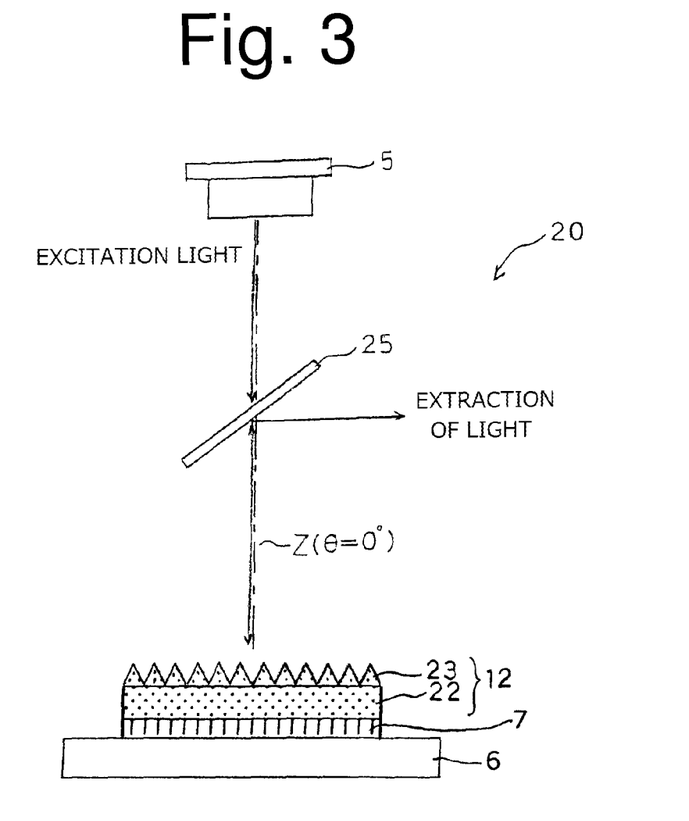
FIG. 3 is a schematic diagram illustrating an exemplary structure of a light source device made in accordance with principles of the presently disclosed subject matter.
Figure 4:
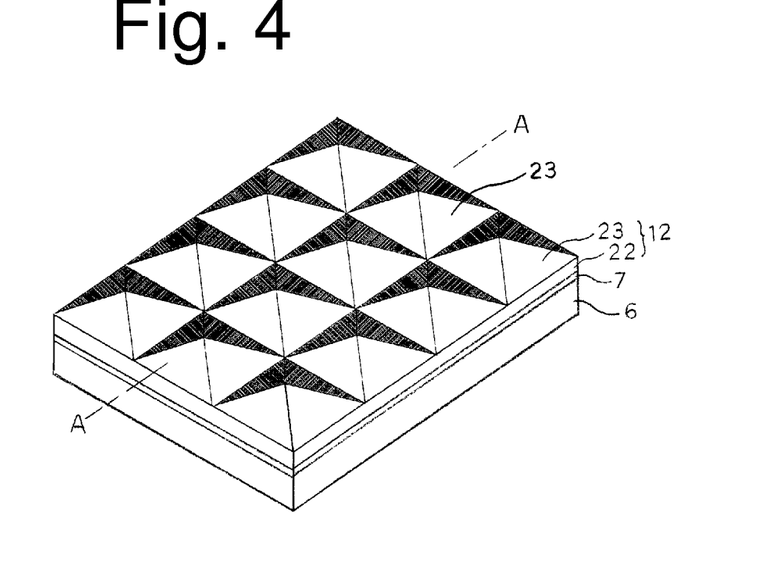
FIG. 4 is a perspective view showing part of a fluorescent layer of FIG. 3 in an enlarged manner.
Figure 5:
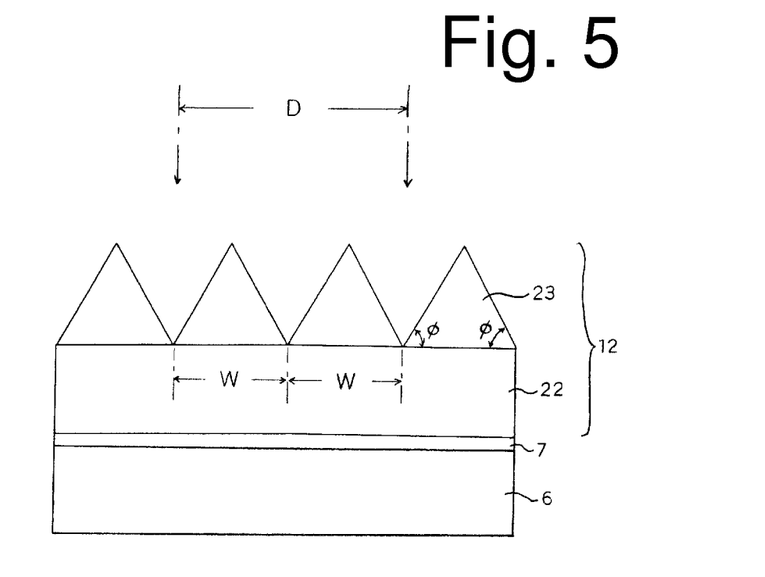
FIG. 5 is a cross-sectional view taken along line A-A of FIG. 4.

FIGS. 3, 4 and 5 show an exemplary structure of a light source device of the presently disclosed subject matter. FIG. 4 is a perspective view showing part of a fluorescent layer of FIG. 3 in an enlarged manner. FIG. 5 is a sectional view taken along line A-A of FIG. 4. In FIGS. 3, 4 and 5, components similar to those of FIG. 2 are identified by the same reference numbers. Referring to FIG. 3, a light source device 20 can also include a fixed light source 5 that can emit light of a predetermined wavelength within a wavelength region covering the wavelength of ultraviolet light and that of visible light, and a fluorescent layer 12 containing a fluorescent material of at least one type that can be excited by excitation light from the fixed light source 5 to emit fluorescent light of a wavelength longer than that of light emitted from the fixed light source 5. The fixed light source 5 and the fluorescent layer 12 can be spaced from each other.

The fluorescent layer 12 may contain a resin component (for example, the fluorescent layer 12 may be formed by dispersing a fluorescent material in a highly transparent resin such as silicone resin and applying it). The fluorescent layer 12 may alternatively be glass sealed. Further, the fluorescent layer 12 may contain substantially no resin component (such as fluorescent ceramic).

If the fluorescent layer 12 contains substantially no resin component, discoloration with heat can be prevented and light may be absorbed less. In this case, brightness can be increased to a higher level.

Herein the fluorescent layer 2 containing substantially no resin component means that a resin component typically used for formation of a fluorescent layer can constitute 5% by weight or smaller than 5% by weight of the fluorescent layer. Examples of such a fluorescent layer may include one realized by dispersing fluorescent powder in glass, a glass fluorescent material formed by adding luminescent center ions to a glass matrix, and a single crystal or a polycrystal of a fluorescent material (hereinafter called fluorescent ceramic). During the manufacturing process of a fluorescent material, a material is formed into an arbitrary shape, and then sintered. The fluorescent ceramic can be a mass of the resultant fluorescent material. The fluorescent ceramic may use an organic component as a binder during shaping as one of the processes of manufacturing the fluorescent ceramic. This organic component can be fired (decomposed and vaporized) in a degreasing step performed after the shaping. Accordingly, the organic resin component can constitute only 5% by weight or smaller than 5% by weight of the sintered fluorescent ceramic. This means that the fluorescent layer described here contains substantially no resin component and is composed only of an inorganic material, so that discoloration with heat can be prevented. Generally, glass or ceramic composed only of an inorganic material has heat conductivity higher than that of resin. This acts advantageously on dissipation of heat from the fluorescent layer 12 to a substrate 6. In particular, fluorescent ceramic generally has heat conductivity still higher than that of glass and is manufactured at lower costs than those required to manufacture a single crystal. In this regard, fluorescent ceramic can be used to form the fluorescent layer 12.

The fluorescent layer 12 can contain a fluorescent material of at least one type that is excited by excitation light from the fixed light source 5 to emit fluorescent light of a wavelength longer than that of the light emitted from the fixed light source 5. More specifically, if the fixed light source 5 emits ultraviolet light, the fluorescent layer 12 can contain at least one of blue, green, and red fluorescent materials, for example. If the fixed light source 5 emits ultraviolet light, and if the fluorescent layer 12 contains blue, green, and red fluorescent materials, for example (if the fluorescent layer 12 contains a mixture of uniformly dispersed blue, green, and red fluorescent materials, for example), irradiation of the fluorescent layer 12 with ultraviolet light from the fixed light source 5 results in white illuminating light obtained as reflecting light. If the fixed light source 5 emits ultraviolet light, and if the fluorescent layer 12 contains a blue, green, or red fluorescent material, for example, irradiation of the fluorescent layer 12 with ultraviolet light from the fixed light source 5 results in blue, green, or red illuminating light (single-color light) obtained as reflecting light. If the fixed light source 5 emits blue light being visible light, the fluorescent layer 12 can contain at least one of green, red, and yellow fluorescent materials, for example. If the fixed light source 5 emits blue light being visible light, and if the fluorescent layer 12 contains green and red fluorescent materials, for example (if the fluorescent layer 12 contains a mixture of uniformly dispersed green and red fluorescent materials, for example), irradiation of the fluorescent layer 12 with blue light from the fixed light source 5 results in white illuminating light and the like obtained as reflecting light. If the fixed light source 5 emits blue light being visible light, and if the fluorescent layer 12 contains only a yellow fluorescent material, for example, irradiation of the fluorescent layer 12 with blue light from the fixed light source 5 results in white illuminating light and the like obtained as reflecting light. As described above, single-color light or white light can be obtained by devising a combination of the fixed light source 5 and the fluorescent layer 12 appropriately.

A substrate (heat dissipation substrate) 6 having light reflectivity and heat conductivity can be provided to face a surface of the fluorescent layer 12 opposite to an incident surface of the fluorescent layer 12 to receive the aforementioned excitation light. The fluorescent layer 12 can be connected to the heat dissipation substrate 6 through a connecting part 7.

The light source device 20 adopts a system (hereinafter called reflection system) of extracting light (including excitation light and fluorescent light) by using reflection occurring at a reflection surface being provided at the surface of the fluorescent layer 12 opposite to the incident surface thereof to receive excitation light from the fixed light source 5.

As described above, the light source device 20 of FIG. 3 can basically have the same structure as that of the light source device 10 of FIG. 2. The heat dissipation substrate 6 and the connecting part 7 may be made of the materials described with reference to the light source device 10 of FIG. 2 (materials of the heat dissipation substrate 6 and the connecting part 7 of the light source device 10 of FIG. 2).

In order to address the aforementioned characteristics and problem regarding the light source device 10 of FIG. 2, the light source device 20 of FIG. 3 can have a surface structure with depressions or projections as shown in the enlarged view of FIGS. 4 and 5. More specifically, the fluorescent layer 12 can be composed of a fluorescent plate 22, and a plurality of segments 23 in the form of depressions or projections formed on the fluorescent plate 22. In the example shown in FIGS. 4 and 5, the segments 23 in the form of depressions or projections each have the shape of a quadrangular pyramid, and are in contact with each other.

The size (length of the base) W of each of the segments 23 (having the shape of a quadrangular pyramid) can be from about 10 μm to about 100 μm, for example, and can be smaller than the size (diameter or width) D (that is from about 200 μm to about 300 μm, for example) of an irradiation spot of excitation light from the fixed light source 5. As described later, in order to increase brightness further (to increase an on-axis brightness rate described later), each of the segments 23 (having the shape of a quadrangular pyramid) can have a rise angle $\phi$ in a range of from about 30 degrees to about 70 degrees.

In order to form the fluorescent layer 12, the fluorescent plate 22 and the segments 23 in the form of depressions or projections can be made of the same fluorescent material, and may be prepared integrally, for example. Alternatively, in order to form the fluorescent layer 12, the fluorescent plate 22 and the segments 23 in the form of depressions or projections can be made of the same fluorescent material, and may be prepared separately. Then, the separately prepared fluorescent plate 22 and segments 23 in the form of depressions or projections may be bonded together.

The light source device 20 of FIG. 3 can be configured so as to let excitation light from the fixed light source 5 enter the fluorescent layer 12 in the direction of an axis Z that is perpendicular to a surface of the fluorescent layer 12 on which the excitation light is projected (namely, where $\theta$ is zero degrees). Here, the surface of the fluorescent layer 12 on which the excitation light is projected is defined based on the assumption that the segments 23 in the form of depressions or projections are not provided (that the fluorescent layer 12 includes only the fluorescent plate 22), and corresponds to the surface of the fluorescent layer 2 on which excitation light is projected in the light source device 10 of FIG. 2. The light source device 20 of FIG. 3 can be configured so as to let excitation light from the fixed light source 5 enter the fluorescent layer 12 in the direction of the axis Z that is perpendicular to the surface of the fluorescent layer 12 on which the excitation light is projected (namely, where θ is zero degrees). Here, the surface of the fluorescent layer 12 on which the excitation light is projected is defined based on the assumption that the segments 23 in the form of depressions or projections are not provided (that the fluorescent layer 12 includes only the fluorescent plate 22), and corresponds to the surface of the fluorescent layer 2 on which excitation light is projected in the light source device 10 of FIG. 2. Accordingly, a half mirror 25 can be provided to separate reflecting light from the fluorescent layer 12 (including excitation light and fluorescent light) from incident light to extract the reflecting light.

Figure 6:
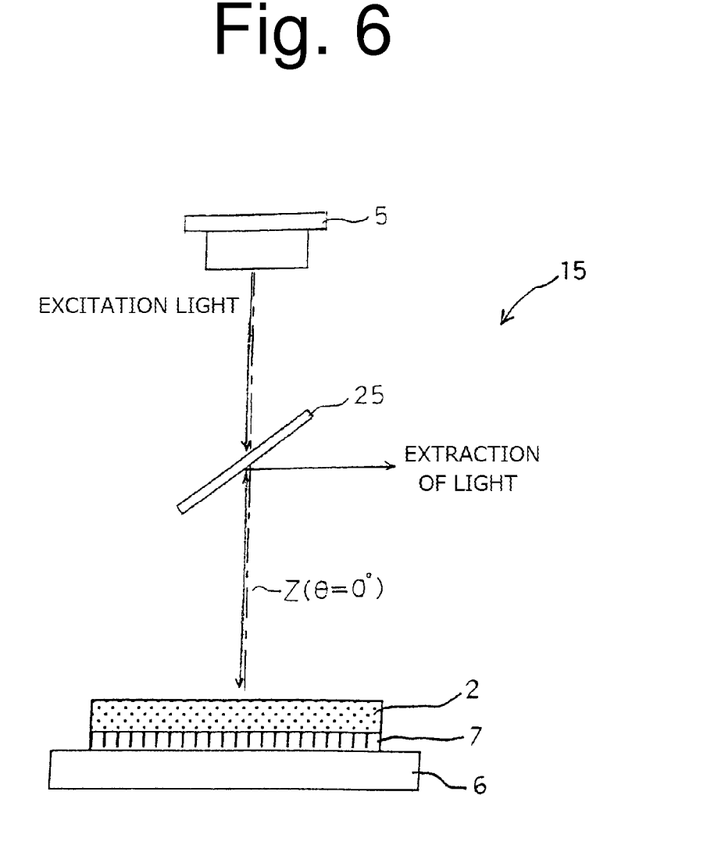
FIG. 6 is a schematic diagram illustrating a light source device that differs from the light source device of FIG. 2 in that excitation light from a fixed light source is caused to enter a fluorescent layer in the direction of an axis Z perpendicular to a surface of the fluorescent layer on which the excitation light can be projected (namely, where 0 is zero degrees)

The light source device 20 of FIG. 3 is compared with a light source device 15 shown in FIG. 6. The light source device 15 of FIG. 6 differs from the light source device 10 of FIG. 2 in that, excitation light from the fixed light source 5 can be caused to enter the fluorescent layer 2 in the direction of the axis Z perpendicular to an incident surface of the fluorescent layer 2 on which the excitation light is projected (namely, where θ is zero degrees). Here, the surface of the fluorescent layer 2 on which the excitation light is projected is defined based on the assumption that the fluorescent layer 2 includes only the fluorescent plate 22 and does not include the segments 23 in the form of depressions or projections.

Figure 7A:
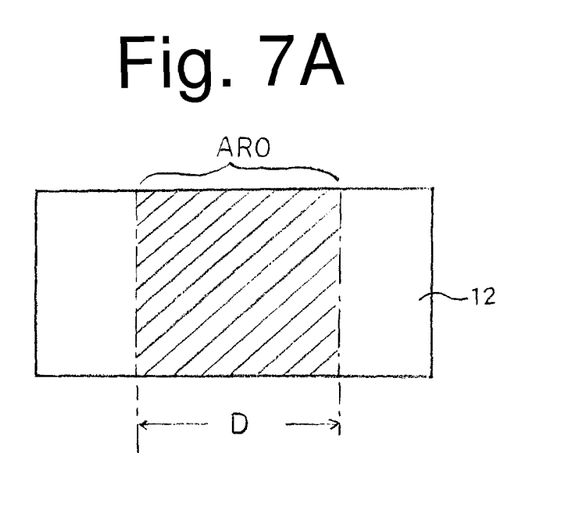
FIGS. 7A and 7B are diagrams showing a range of irradiation with excitation light from the fixed light source in the light source device of FIG. 3.
Figure 7B:
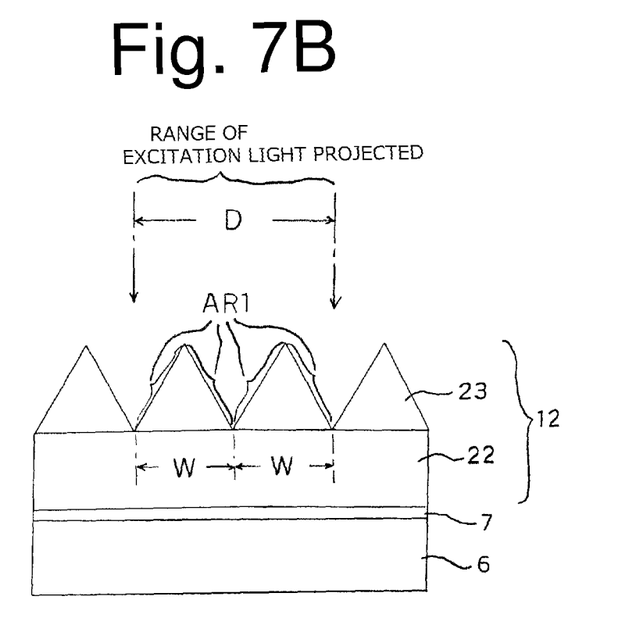
Figure 8A:
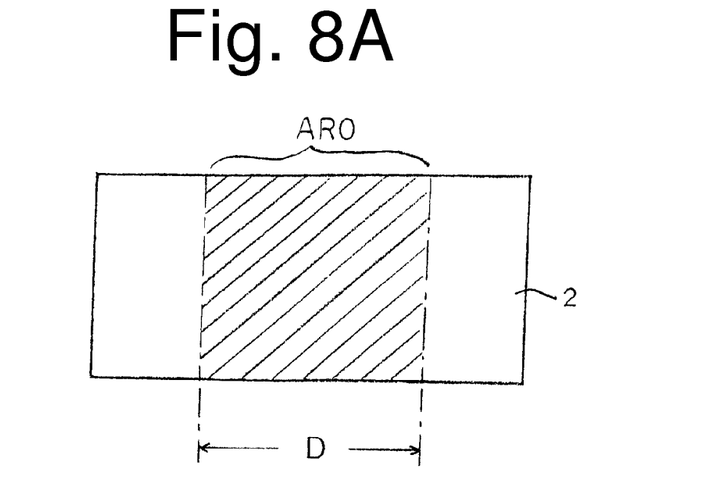
FIGS. 8A and 8B are diagrams showing a range of irradiation with excitation light from the fixed light source in the light source device of FIG. 6.
Figure 8B:
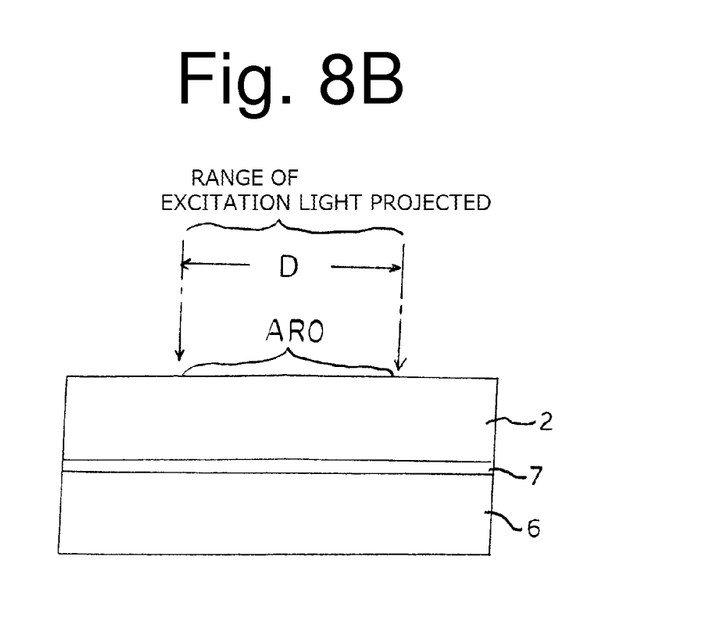

If the size (diameter or width) D of an irradiation spot of excitation light from the fixed light source 5 is from about 200 μm to about 300 μm in the light source device 20 of FIG. 3, the excitation light from the fixed light source 5 can be projected on a range shown in FIGS. 7A and 7B. In the light source device 15 of FIG. 6, excitation light from the fixed light source 5 can be projected on a range shown in FIGS. 8A and 8B. FIGS. 7A and 8A are top views, and FIGS. 7B and 8B are side views. As seen from a comparison between FIGS. 7A and 8A, the light source device 20 of FIG. 3 and the light source device 15 of FIG. 6 achieve areas of the fluorescent layers 12 and 2 on which excitation light is projected (sectional area of irradiation perpendicular to the axis Z of irradiation with excitation light from the fixed light source 5) that are equally AR0 as viewed from above. This means that the light source device 20 of FIG. 3 does not reduce brightness compared to the light source device 15 of FIG. 6. Further, it is seen from a comparison between FIGS. 8A and 8B that, while an actual area of irradiation of the fluorescent layer 2 with excitation light is the sectional area AR0 of irradiation perpendicular to the axis Z of irradiation with excitation light from the fixed light source 5 in the light source device 15 of FIG. 6, an actual area of irradiation of the fluorescent layer 12 with excitation light is AR1 (>AR0) in the light source device 20 of FIG. 3. The area AR1 is greater than the area AR0. Accordingly, the light source device 20 of FIG. 3 can prevent increase of an excitation density in the fluorescent layer 12 and suppress the local increase of the temperature of the fluorescent layer 12 while generating little or no reduction of brightness.

Figure 9:
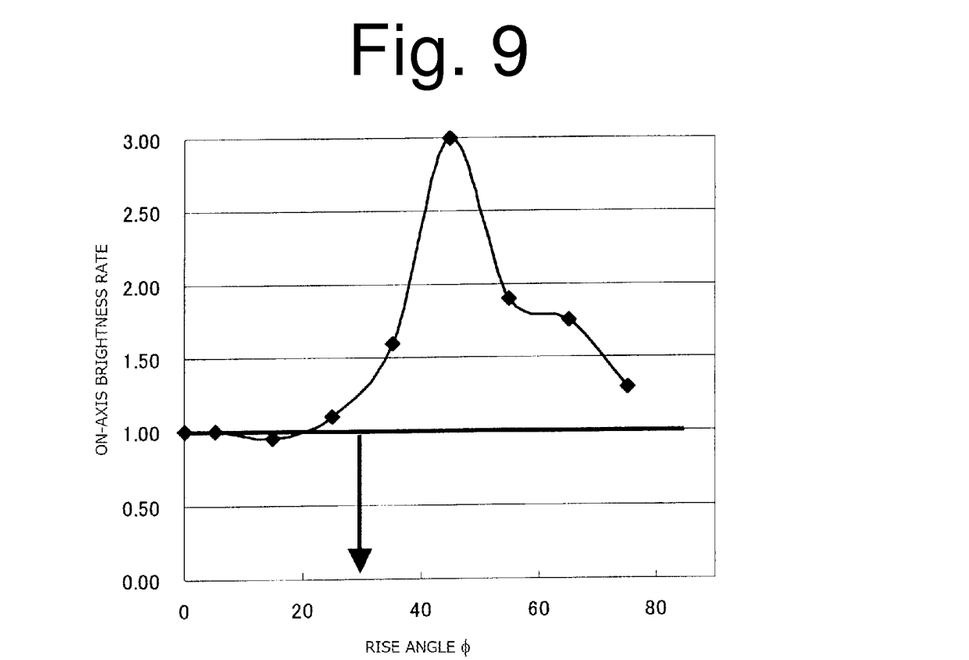
FIG. 9 is a graph showing a measurement result about an on-axis brightness rate relative to the rise angle $\phi$ of each of a plurality of segments in the light source device of FIGS. 3, 4 and 5.

FIG. 9 shows a measurement result about an on-axis brightness rate relative to the rise angle φ of each of the segments 23 (having the shape of a quadrangular pyramid) in the light source device 20 of FIGS. 3, 4 and 5. This on-axis brightness rate is a brightness rate determined at each rise angle φ and in the direction of the axis Z, and is relative to brightness determined in the direction of the axis Z if the rise angle φ is zero degrees. It is seen from FIG. 9 that, in order to increase brightness to a higher level, each of the segments 23 (having the shape of a quadrangular pyramid) can have the rise angle φ in a range of from about 30 degrees to about 70 degrees.

As described above, the light source device 20 of FIGS. 3, 4 and 5 can prevent increase of an excitation density in the fluorescent layer 12 and prevent local increase of the temperature of the fluorescent layer 12 while generating little or no reduction of brightness, thereby preventing the temperature quenching of the fluorescent layer 12. Further, if the fluorescent layer 12 is made of fluorescent ceramic and the like, cracking of the fluorescent layer 12 (made of fluorescent ceramic and the like) can be prevented.

The segments 23 in the form of depressions or projections are each shown to have the shape of a quadrangular pyramid in the example of FIGS. 3, 4 and 5. Meanwhile, the segments 23 may each have the shape of a pyramid except a quadrangular pyramid (such as a triangular pyramid, for example), or may have the shape of a circular cone. If the segments 23 in the form of depressions or projections each have the shape of a pyramid except a quadrangular pyramid (such as a triangular pyramid, for example) or the shape of a circular cone, the segments 23 in the form of depressions or projections are still in contact with each other. In this case, the size (length of the base) W of the pyramid or the circular cone is still from about 10 μm to about 100 μm, for example, and is smaller than the size (diameter or width) D (that is from about 200 μm to about 300 μm, for example) of an irradiation spot of excitation light from the fixed light source 5. Further, each of the segments 23 (having the shape of a pyramid or circular cone) can have a rise angle φ in a range of from about 30 degrees to about 70 degrees. Alternatively, the segments 23 in the form of depressions or projections may each have the shape of a hemisphere shape, for example. If the segments 23 in the form of depressions or projections each have the hemisphere shape, the segments 23 in the form of depressions or projections can still be in contact with each other. In this case, the size (length of one side of a square or a hexagon inscribed in the base) W of each of the segments 23 in the hemisphere shape is still from about 10 μm to about 100 μm, for example, and is smaller than the size (diameter or width) D (that is from about 200 μm to about 300 μm, for example) of an irradiation spot of excitation light from the fixed light source 5. Further, each of the segments 23 can be in the shape of a dome that has a rise angle φ in a range of from about 30 degrees to about 70 degrees. However, the segments 23 in the form of depressions or projections each having the hemisphere shape may result in lower efficiency of use of light than that achieved by the segments 23 in the form of depressions or projections each having the shape of a pyramid or a circular cone. Accordingly, the segments 23 can be in the form of depressions or projections that each have the shape of a pyramid or a circular cone.

Figure 10:
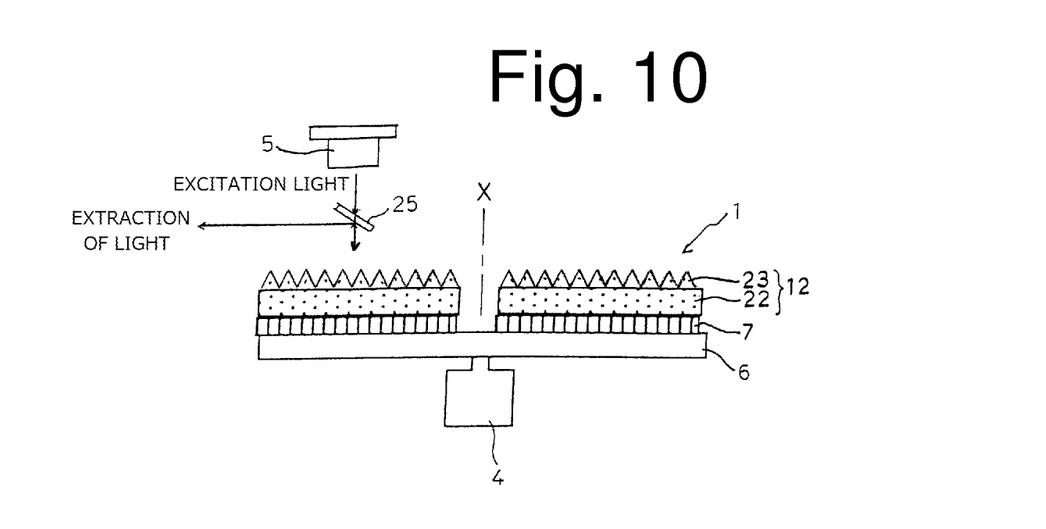
FIG. 10 is a schematic view illustrating an example where a fluorescent layer is formed as a reflection type fluorescent rotary body that is caused to rotate about an axis of rotation.

In the aforementioned light source device of the presently disclosed subject matter, the fluorescent layer 12 may be fixed or movable. For example, the fluorescent layer 12 may be formed as a reflection type fluorescent rotary body 1 that can be caused (by a motor 4 and the like) to rotate about an axis of rotation X as shown in FIG. 10. To be specific, the reflection type fluorescent rotary body 1 can be formed by connecting the fluorescent layer 12 and the heat dissipation substrate 6, and by coupling the connected fluorescent layer 12 and the heat dissipation substrate 6 to the motor 4 and the like. The heat dissipation substrate 6 and a connecting part can function as a reflection surface that causes reflection of excitation light and fluorescent light. The heat dissipation substrate 6 may have the shape of a disk or a quadrangle. In order to maintain stability during rotation, part of the disk may be cut, or conversely, a weight may be placed on the heat dissipation substrate 6. The fluorescent rotary body 1 originally allows suppression of heat generation of a fluorescent material, so that use of the fluorescent rotary body 1 can increase brightness to a higher level.

The aforementioned light source device of the presently disclosed subject matter will be described in more detail below.

In the aforementioned light source device of the presently disclosed subject matter, a light-emitting diode or a semiconductor laser that emits light of a wavelength within a wavelength region covering the wavelength of ultraviolet light and that of visible light can be used as the fixed light source 5.

As a specific example, the fixed light source 5 may be a light-emitting diode or a semiconductor laser made of an InGaN material and which emits near-ultraviolet light having a wavelength of about 380 nm. In this case, the fluorescent layer 12 can contain a fluorescent material that is excited by ultraviolet light having a wavelength in a range of from about 380 nm to about 400 nm. Examples of a red fluorescent material to be excited by such ultraviolet light may include $CaAlSiN_3:Eu^{2+}$, $Ca_2Si_5N_8:Eu^{2+}$, $La_2O_2S:Eu^{3+}$, $KSiF_6:Mn^{4+}$, and $KTiF_6:Mn^{4+}$. Examples of a green fluorescent material to be excited by such ultraviolet light may include $Lu_3Al_5O_{12}:Ce^{3+}$, $(Si,Al)_6(O,N)_8:Eu^{2+}$, $BaMgAl_{10}O_{17}:Eu^{2+}$, $Mn^{2+}$, and $(Ba,Sr)_2SiO_4:Eu^{2+}$. Examples of a blue fluorescent material to be excited by such ultraviolet light may include $(Sr,Ca,Ba,Mg)_{10}O_4)_6Cl_2:Eu^{2+}$, $BaMgAl_{10}O_{17}:Eu^{2+}$, and $LaAl(Si,Al)_6(N,O)_{10}:Ce^{3+}$.

The fixed light source 5 may alternatively be a light-emitting diode or a semiconductor laser made of a GaN material and which emits blue light having a wavelength of about 460 nm. In this case, the fluorescent layer 12 can contain a fluorescent material that is excited by blue light having a wavelength in a range of from about 440 nm to about 470 nm. Examples of a red fluorescent material to be excited by such blue light may include $CaAlSiN_3:Eu^{2+}$, $Ca_2Si_5N_8:Eu^{2+}$, $KSiF_6:Mn^{4+}$, and $KTiF_6:Mn^{4+}$. Examples of a green fluorescent material to be excited by such blue light may include $Lu_3Al_5O_{12}:Ce^{3+}$, $Y_3(Ga,Al)_5O_{12}:Ce^{3+}$, $Ca_3Sc_2Si_3O_{12}:Ce^{3+}$, $CaSc_2O_4:Eu^{2+}$, $(Ba,Sr)_2SiO_4Eu^{2+}$, $Ba_3Si_6O_{12}N_2:Eu^{2+}$, and $(Si,Al)_6(O,N)_8:Eu^{2+}$. Examples of a yellow fluorescent material to be excited by blue light having a wavelength in a range of from about 440 nm to about 470 nm may include $Y_3Al_5O_{12}:Ce^{3+}$ (YAG), $(Sr,Ba)_2SiO_4:Eu^{2+}$, and $Ca_x(Si,Al)_{12}(O,N)_{16}:Eu^{2+}$.

The fluorescent layer 12 may be formed by dispersing powder of the aforementioned fluorescent materials in glass, for example. In addition to this, the fluorescent layer 12 may be made of a glass fluorescent material formed by adding luminescent center ions to a glass matrix, or fluorescent ceramic not containing a binding member such as resin. As a more specific example, if the fluorescent layer 12 is formed by dispersing fluorescent powder into glass, the fluorescent layer 12 may be formed by dispersing powder of fluorescent materials of the aforementioned compositions into glass containing a component such as $P_2O_5$, $SiO_2$, $B_2O_3$ and $Al_2O_3$. Examples of the glass fluorescent material formed by adding luminescent center ions to a glass matrix may include a glass fluorescent material based on oxynitride such as Ca—Si—Al—O—N and Y—Si—Al—O—N formed by adding $Ce^{3+}$ or $Eu^{2+}$ as an activator. Examples of the fluorescent ceramic may include a sintered body composed of fluorescent materials of the aforementioned compositions, and which contains substantially no resin component. Specifically, fluorescent ceramic having light-transmitting properties can successfully be used. The light-transmitting properties of the fluorescent ceramic mentioned here are given for the reason that a sintered body thereof contains substantially no pores or impurities in a grain boundary that may lead to light scattering. Pores and impurities may also become interferences with heat diffusion. Accordingly, light-transmitting ceramic has high heat conductivity. Thus, if light-transmitting ceramic is used to form a fluorescent layer, excitation light and fluorescent light may not be lost because they are prevented from escape, and therefore can be extracted from the fluorescent layer and then used. Additionally, heat generated in the fluorescent layer is allowed to dissipate efficiently. If a sintered body does not have light-transmitting properties, it desirably has the smallest possible number of pores or impurities. An index used to evaluate remaining pores may be a value indicating the specific gravity of fluorescent ceramic. This value can be 95% or higher of a theoretical value obtained by calculation.

A method of manufacturing fluorescent ceramic having light-transmitting properties will now be described below on the basis of the assumption that the fluorescent ceramic is a $Y_3Al_5O_{12}:Ce^{3+}$ fluorescent material that emits yellow light in response to irradiation with blue excitation light. The fluorescent ceramic can be manufactured by following a mixing step, a shaping step, a sinter step, and a finishing step of a starting material. Examples of the starting material may include an oxide of a constituent element of a $Y_3Al_5O_{12}:Ce^{3+}$ fluorescent material such as yttrium oxide, cerium oxide and alumina, and a material to become an oxide after being sintered such as carbonate, nitrate and sulfate. The starting material can have a submicron-sized grain diameter. These materials can be weighted to achieve a stoichiometric proportion. At this time, a chemical compound such as that of calcium and silicon may be added with the intension of enhancing the transmitting properties of the sintered ceramic. The weighted materials can be dispersed and mixed well in water or an organic solvent with a wet ball mill. Next, a resultant mixture can be formed into a predetermined shape. Shaping may be performed in a uniaxial pressing method, cold isostatic pressing method, slip casting method, or injection molding method. A resultant shaped body can be sintered in a temperature of from 1600° C. to 1800° C., thereby obtaining the $Y_3Al_5O_{12}:Ce^{3+}$ fluorescent ceramic having light-transmitting properties.

The fluorescent ceramic thereby obtained can be polished into a thickness of from several tens to several hundreds of micrometers by using an automatic polishing unit and the like. Then, before being used, the fluorescent ceramic can further be subjected to dicing or scribing performed with a diamond cutter or laser to be shaped into a structure with a fluorescent plate and a plurality of segments in the form of depressions or projections formed on the fluorescent plate. An incident surface of the fluorescent ceramic through which excitation light enters the fluorescent ceramic may be given an AR coating (film having an antireflection function).

In the aforementioned example, in order to form the fluorescent layer 12, the fluorescent plate 22 and the segments 23 in the form of depressions or projections can be made of the same fluorescent material, and may be prepared integrally, for example. Alternatively, the fluorescent plate 22 and the segments 23 in the form of depressions or projections can be made of the same fluorescent material, and may be prepared separately. The separately prepared fluorescent plate 22 and the segments 23 in the form of depressions or projections can be bonded together. The segments 23 in the form of depressions or projections may be made of glass or a light-transmitting material. Meanwhile, if the segments 23 in the form of depressions or projections are made of the same fluorescent material as that of the fluorescent plate 22, the segments 23 can have the same index of refraction as that of the fluorescent plate 22, and can become optically continuous with the fluorescent plate 22. Thus, the on-axis brightness shown in FIG. 9 can be obtained in this case. In contrast, if the segments 23 in the form of depressions or projections are made of glass or a light-transmitting material, the segments 23 are not optically continuous with the fluorescent plate 22 unless they have the same index of refraction as that of the fluorescent plate 22. In this case, brightness may not be satisfactorily increased. Accordingly, if the segments 23 in the form of depressions or projections are made of glass or a light-transmitting material, a material to be used for the segments 23 can have an index of refraction that is as close as possible to that of the fluorescent plate 22.

A metal substrate, or a substrate made of oxide ceramic or nonoxide ceramic can be used as the heat dissipation substrate 6. In particular, it may be desirable that a metal substrate having excellent light reflecting properties, excellent heat conduction properties, and excellent processability be used as the heat dissipation substrate 6. By way of example, metal of a single metallic element such as Al, Cu, Ti, Si, Ag, Au, Ni, Mo, W, Fe and Pd, or an alloy containing these metallic elements can be used as the heat dissipation substrate 6. Further, the surface of the heat dissipation substrate 6 may be given a reflection increasing coating or a corrosion preventive coating. Additionally, the heat dissipation substrate 6 may be provided with a structure such as a fin intended to enhance heat dissipating properties.

As described above, in the presently disclosed subject matter, the fixed light source 5 and the fluorescent layer 12 can be arranged on the same side with respect to the heat dissipation substrate 6 to realize a reflection type light source device. As a matter of course, an optical element such as a lens can be placed between the fixed light source 5 and the fluorescent layer 12 where desired.

A lighting device capable of increasing brightness can be provided by combining the aforementioned light source device of various types of the presently disclosed subject matter and an optical member such as a certain lens system.

The presently disclosed subject matter can be used for many different types of lighting, including general lighting, vehicle lights, and exterior lighting, for example.

It will be apparent to those skilled in the art that various modifications and variations can be made in the presently disclosed subject matter without departing from the spirit or scope of the presently disclosed subject matter. Thus, it is intended that the presently disclosed subject matter cover the modifications and variations of the presently disclosed subject matter provided they come within the scope of the appended claims and their equivalents. All related art references described above are hereby incorporated in their entirety by reference.

What is claimed is:

1. A light source device, comprising:
    a light source configured to emit light of a predetermined wavelength within a wavelength region covering the wavelength of ultraviolet light and the wavelength of visible light;
    a wavelength conversion layer including a wavelength conversion material of at least one type that is excited by excitation light from the light source to emit fluorescent light of a wavelength longer than the wavelength of light emitted from the light source,
    the light source and the wavelength conversion layer being spaced from each other, the light source device employing a reflection system of extracting at least fluorescent light from an incident surface of the wavelength conversion layer through which excitation light from the light source enters the wavelength conversion layer, the wavelength conversion layer having a surface structure with at least one of depressions and projections;
    a heat dissipation substrate having light reflectivity heat conductivity; and
    a connecting part configured to connect the wavelength conversion layer to the heat dissipation substrate.

2. The light source device according to claim 1, wherein the wavelength conversion layer includes a fluorescent plate, and the at least one of depressions and projections are configured as a plurality of segments on the fluorescent plate, and a size of each of the segments is smaller than a size of an irradiation spot of excitation light received from the light source.

3. The light source device according to claim 1, wherein the wavelength conversion layer is a fluorescent ceramic.

4. The light source device according to claim 2, wherein the wavelength conversion layer is a fluorescent ceramic.

5. The light source device according to claim 1, further comprising:
    a fluorescent rotary body including the wavelength conversion layer.

6. The light source device according to claim 2, further comprising:
    a fluorescent rotary body including the wavelength conversion layer.

7. The light source device according to claim 3, further comprising:
    a fluorescent rotary body including the wavelength conversion layer.

8. The light source device according to claim 4, further comprising:
    a fluorescent rotary body including the wavelength conversion layer.

9. The light source device according to claim 1, wherein the wavelength conversion layer is a fluorescent layer.

10. The light source device according to claim 2, wherein the wavelength conversion layer is a fluorescent layer.

11. The light source device according to claim 3, wherein the wavelength conversion layer is a fluorescent layer.

12. The light source device according to claim 4, wherein the wavelength conversion layer is a fluorescent layer.

13. The light source device according to claim 5, wherein the wavelength conversion layer is a fluorescent layer.

14. The light source device according to claim 6, wherein the wavelength conversion layer is a fluorescent layer.

15. The light source device according to claim 7, wherein the wavelength conversion layer is a fluorescent layer.

16. The light source device according to claim 8, wherein the wavelength conversion layer is a fluorescent layer.

17. A lighting device configured to include the light source as recited in claim 1.

18. The light source device according to claim 1, wherein the light source is a fixed light source.

19. The light source device according to claim 1, further comprising:
    a half mirror located between the light source and the wavelength conversion layer.

20. The light source device according to claim 1, further comprising:
    at least one of a gas and a vacuum located between the light source and the wavelength conversion layer.

21. The light source device according to claim 1, wherein the connecting part is made of a material having light reflectivity and heat conductivity.

* * * * *